(12) United States Patent
Malone et al.

(10) Patent No.: US 6,262,690 B1
(45) Date of Patent: Jul. 17, 2001

(54) METHOD FOR EFFICIENTLY GENERATING SELECTABLE ANTENNA POLARIZATION

(75) Inventors: Hugh Robert Malone, Phoenix; Ronald Dee Fuller, Mesa, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/687,361

(22) Filed: Oct. 13, 2000

(51) Int. Cl.[7] .................................................. H01Q 1/50
(52) U.S. Cl. .................. 343/850; 343/876; 343/853; 333/101; 333/21 A
(58) Field of Search .............................. 343/850, 853, 343/756, 876; 333/101, 21 A, 109; H01Q 1/50

(56) References Cited

U.S. PATENT DOCUMENTS

| | | | |
|---|---|---|---|
| 4,005,425 | 1/1977 | Nagy | 343/17.7 |
| 4,088,970 | 5/1978 | Fassett et al. | 333/31 R |
| 4,710,734 | 12/1987 | Sterns | 333/101 |
| 4,754,277 | * 6/1988 | Voyce | 342/83 |
| 5,270,719 | 12/1993 | Roth | 342/157 |
| 5,375,257 | 12/1994 | Lampen | 455/83 |
| 5,444,455 | 8/1995 | Louzir et al. | 343/895 |
| 6,181,920 | * 1/2001 | Dent et al. | 455/101 |

OTHER PUBLICATIONS

An article entitled "Progress On The Development Of The Optical Communications Demonstrator", by Tsun–Yee Yan, Muthu Jeganathan and James R. Lesh, California Institute of Technology from Free Space Laser Communication Technologies IX, 1997 SPIE vol. 2990.

An article entitled "Laser Crosslink Subsystem—An Overview", by R.B. Deadrick and W.F. Deckelman, McDonnell Douglas Electronic Systems Company, from SPIE vol. 1635 Free–Space Laser Communication Technologies IV(1992)/ 225.

* cited by examiner

*Primary Examiner*—Hoanganh Le
(74) *Attorney, Agent, or Firm*—Frank J. Bogacz

(57) ABSTRACT

An antenna system (10) capable of transmitting electromagnetic radiation using the technique of combining two quadrature signals for either right hand circular polarization or left hand circular polarization using a circularly polarized antenna (30), or alternately, either horizontal or vertical polarization using a linearly polarized antenna (36) while incorporating feedback for automatically correcting for amplitude and phase variations in the quadrature paths using a switch (12) which selects the sense of the polarization and electronic optimization of the transmit antenna (30, 36). The antenna system includes a control circuit having a polarization switch (12) for receiving a transmission signal. The switch (12) generates first and second output signals which are substantially similar to the transmission signal, and determines whether to apply the transmission signal to one of a first or a second switch output. A coupler (14) receives the first and second switch outputs and generates first and second output signals having a predetermined phase difference. A variable detector (16, 18) detects and adjusts a relative amplitude and phase of the respective first and second output signals. An error correction circuit (34) determines an adjustment to the variable phase detector to vary the phase and amplitude of the first and second output signals in accordance with the relative amplitude and phase of the respective first and second output signals.

19 Claims, 2 Drawing Sheets

METHOD FOR EFFICIENTLY GENERATING SELECTABLE ANTENNA POLARIZATION

BACKGROUND OF THE INVENTION

1. Field of the Invention

This invention relates to an antenna system capable of transmitting electromagnetic radiation and, more particularly, to microwave transmitters associated with an antenna which allows the user to select antenna polarization.

2. Background Information

It is known in the radio frequency (RF) field that feeding two linearly polarized antenna elements with quadrature signals yields circular polarization. It is also known that operating on the relative phase of each of these signals changes the sense of the circular polarization. This technique is generally limited to radar and jamming applications where the amount of cross-polarization signal is less important. However, in the field of communications, dual polarization is often used to increase the number of independent signals that can share a common spectrum. Therefore, for communication applications, it becomes critical to minimize the level of the cross-polarized signal to facilitate the maximum number of independent signals.

The conventional method for generating high quality switchable dual polarization is to use an antenna with two input ports, one for each of the desired polarizations. An RF switch is then used to connect to the appropriate input port of the antenna, thus allowing selection of the desired polarization. Also, in order to meet the output power requirements of many implementations, several amplifiers must be used. As a result, one or more couplers are required for combining the outputs of multiple amplifiers. One must also keep in mind that the RF switch which is selected must be capable of switching the full output power of these amplifiers. In light of this, it is desirable to eliminate the need for high power switching and couplers, reducing the amplification required to overcome the losses inherent in these devices. Finally, it is desirable to alternately utilize a quadrature coupler for recombining quadrature signals, allowing application to linearly polarized antenna systems.

BRIEF DESCRIPTION OF THE DRAWINGS

The present invention will hereinafter be described in conjunction with the appended drawing figures, wherein like numerals denote like elements, and.

DETAILED DESCRIPTION OF THE PREFERRED EXEMPLARY EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred exemplary embodiment of the invention. It being understood that various changes may be made in the function and arrangement of elements without departing from the spirit and scope of the invention as set forth in the appended claims.

This technique for efficiently generating selectable antenna polarization incorporates a circuit for combining two quadrature signals to obtain circular polarization, and adds a simple feedback method to correct for amplitude and phase errors in the signal paths thus minimizing the level of the cross-polarized signal. As additional benefits, the invention eliminates the insertion loss introduced by a polarization switching device, the difficulty in realizing solid state switches for application requiring more than 100 watts of output power, and the need for an expensive polarizator on the output of the antenna, and improves the reliability since the power amplifier failure rate is nearly proportional to the output power requirement of the amplifier while reducing the overall cost of the implementation.

Figure 1:
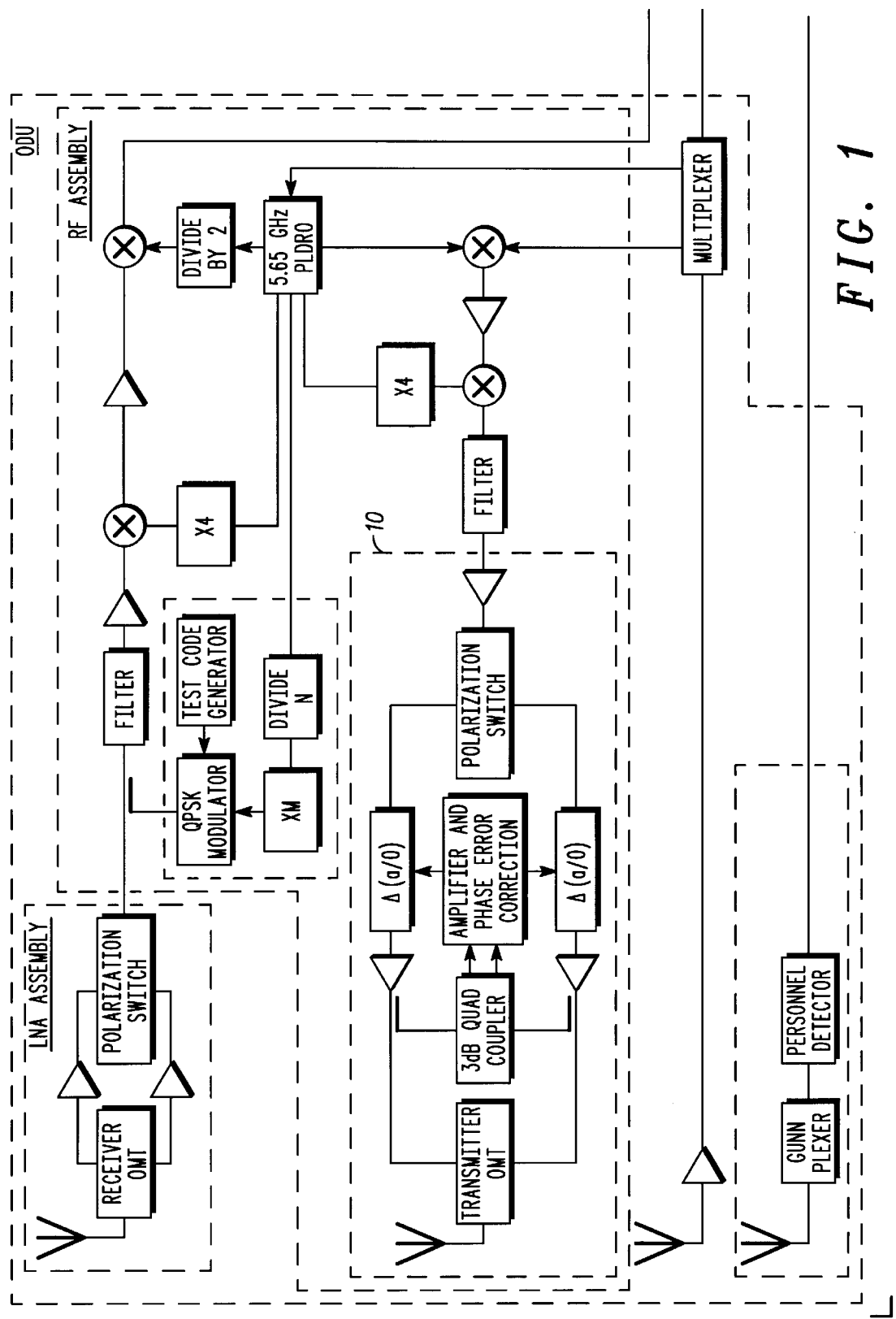
FIG. 1 is a schematic diagram showing a system embodying the invention.

Referring now to FIG. 1, an expanded RF block diagram for the outdoor unit (ODU) is shown wherein the polarization control circuit 10 is contained in the shaded area. Thus, the invention is incorporated in the design of a larger communication system.

Figure 2:
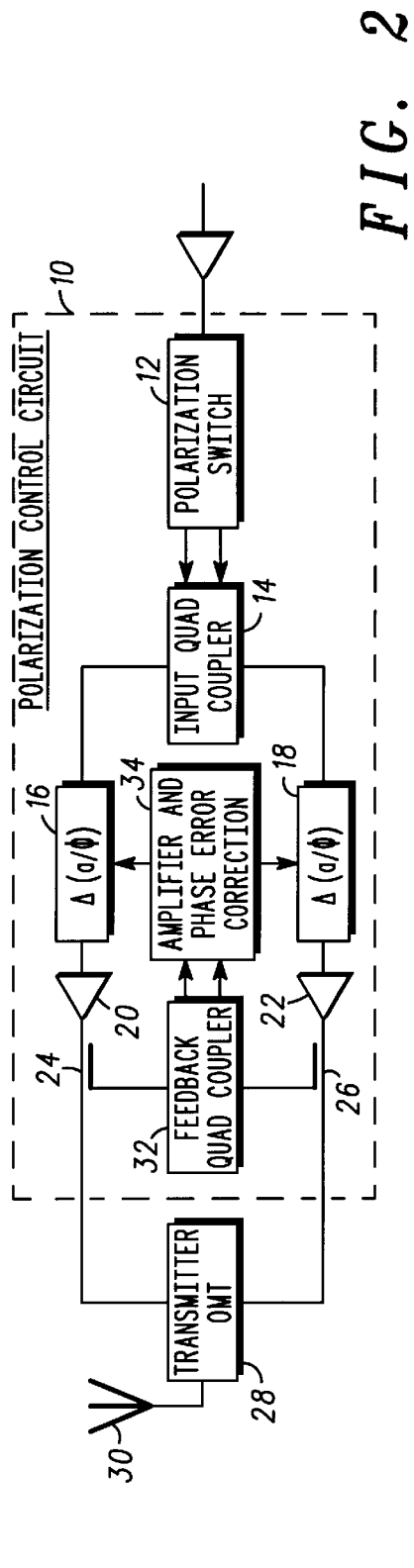
FIG. 2 is a schematic diagram showing the circularly polarized antenna implementation in accordance with a preferred embodiment of the present invention.

Referring now to FIG. 2, a polarization control circuit 10, as contained in the shaded area in FIG. 1, is shown in accordance with a preferred embodiment of the present invention. More specifically, FIG. 2 discloses the polarization control circuit 10 for the circularly polarized antenna implementation of the invention. The forward signal path consists of polarization switch 12, input quadrature coupler 14, which may be a 3 decibel (dB) coupler, amplitude and phase variable elements 16, 18, power amplifiers 20, 22, couplers 24, 26, ortho-mode transducer junction also known as an ortho-mode tees, or dual-mode transducer 28, and a circularly polarized antenna 30. The input signal is applied to polarization switch 12 which allows either right hand circular polarization (RHCP) or left hand circular polarization (LHCP) by selecting the input port of the input quadrature coupler 14 to which the input signal is connected. The outputs of input quadrature coupler 14 are in turn connected to amplitude and phase variable elements 16, 18 which provide the baseline quadrature signals to the inputs of power amplifiers 20, 22 respectively. The outputs of power amplifiers 20, 22 feed two linearly polarized input ports of an ortho-mode transducer 28 through couplers 24, 26. The output of ortho-mode transducer 26 is then connected to circularly polarized antenna 28.

Feedback paths round power amplifiers 20, 22 consist of couplers 24, 26, feedback quadrature coupler 32, which may be a 3 dB coupler, and amplitude and phase error correction circuitry 34, and amplitude and phase variable elements 16, 18.

The operation of this feedback system will now be described in connection with a particular non-limiting example. A sample of the baseline quadrature signal which has been amplified by power amplifiers 20, 22 is taken from the output of power amplifiers 20, 22 by couplers 24, 26 and feed into feedback quadrature coupler 32. Feedback quadrature coupler 32 then provides these signals to amplitude and phase error correction circuitry 34. Amplitude and phase error correction circuitry 34 then processes these signals generating vector error signals which contain the representative amplitude and phase information denoting the deviation from the baseline quadrature signal introduced by power amplifiers 20, 22 in the amplification process. These vector error signals are then applied to amplitude and phase variable elements 16, 18 where they are vectorially added to the baseline quadrature signal which were applied to the inputs of power amplifiers 20, 22 from input quadrature coupler 14. Thus, the feedback compensates for variations in amplitude or phase introduced into the forward path by power amplifiers 20, 22. This then ensures that the two linearly polarized antenna input ports of ortho-mode transducer 28 are fed with equal amplitude signals that differ only in phase by 90 degrees. In other words, this feedback insures that a minimum signal level is obtained from one of the coupler outputs while a maximum signal level is obtained from the other depending upon which polarization is desired. Therefore, the polarization control circuit 10 for the circularly polarized antenna implementation of the invention allows the use of a technique in the field of communications which was generally limited to radar and jamming applications since the level of the cross polarized signal is minimized while allowing the maximum number of independent signals.

Having described the functionality, it is important to point out some addition benefits of polarization control circuit 10 for the circularly polarized antenna implementation of the invention. Since the conventional method for generating high quality switchable dual polarization is to use an antenna with two independent ports and an RF switch to select the appropriate port, problems associated with the RF switch are encountered, as will be described next. First, the RF switch must be capable of handling the full output power of the power amplifiers. The difficulty in realizing solid state switches for applications requiring more than 100 watts of output power in this frequency range are well known. Second, and as a result, the RF switch has insertion loss. This increases the output power requirements of the power amplifiers. Third, the power amplifiers must be turned off when selecting between antenna polarizations. Polarization control circuit 10 for the circularly polarized antenna implementation of the invention overcomes, avoids, and eliminates these problems by relocating polarization switch 12 to the input side of power amplifiers 20, 22. Also, as a result of the reduction in output power requirements, polarization control circuit 10 allows elimination of couplers typically used in the conventional method. This further reduces the output power requirements of the power amplifiers. Polarization control circuit 10 thus benefits in improved reliability over the conventional method since power amplifier failure rates are nearly proportional to output power requirements. Further, since polarization is accomplished electronically, a polarizer is no longer required. Therefore, the overall cost of the implementation is reduced.

Figure 3:
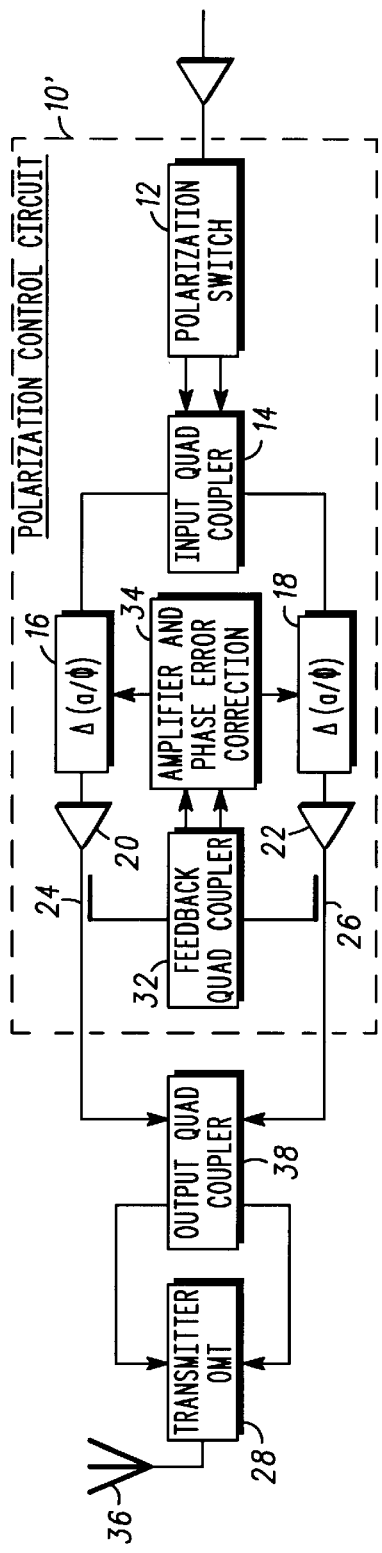
FIG. 3 is a schematic diagram showing the linearly polarized antenna implementation.

Referring now to FIG. 3, a linearly polarized antenna implementation is shown. More specifically, FIG. 3 discloses the polarization control circuit 10' for the linearly polarized antenna implementation of the invention. FIG. 3 differs from FIGS. 1 and 2 only in that linearly polarized antenna 36 is substituted for circularly polarized antenna 30 and the outputs of power amplifiers 20, 22 feed the input ports of output quadrature coupler 38, which may be a 3 dB coupler, through couplers 24, 26 rather than the ortho-mode transducer 28. The outputs of output quadrature coupler 38 are then connected to the input ports of the ortho-mode transducer 28. In turn, the output port of ortho-mode transducer 28 is connected to linearly polarized antenna 36. As will be appreciated, the remaining components of polarization control circuit 10' are substantially similar and function in the manner as those of polarization control circuit 10 of FIG. 2.

The purpose of output quadrature coupler 34 is to recombine the outputs of power amplifiers 20, 22. Therefore, only one input port of ortho-mode transducer 28 will have power applied at any given time. Now, polarization switch 12 selects horizontal or vertical polarization rather than RHCP or LHCP. This then transforms the configuration of FIGS. 1 and 2 for use with a linearly polarized antenna as shown in FIG. 3.

While the principles of the invention have been described above in connection with specific apparatus, it is to be clearly understood that this description is made only by way of example and not as a limitation on the scope of the invention.

What is claimed is:

1. An antenna polarization control circuit, the antenna polarization control circuit receiving a transmission signal, comprising:

a polarization switch for receiving the transmission signal, the polarization switch generating a first and second output signal, each first and second output signal being substantially similar to the transmission signal, the polarization switch having a first switch output and a second switch output, where the polarization switch selects whether to apply the transmission signal to the first switch output or the second switch output;

a coupler, the coupler having first and second inputs respectively connected to the first and second switch outputs, the coupler having first and second coupler outputs, the coupler generating a first output signal for output on the first coupler output and a second output signal for output on the second coupler output, wherein the first and second output signals have a predetermined phase difference;

a variable detector for detecting and adjusting relative amplitude and phase of the first and second output signals; and an error correction circuit for determining an adjustment to the variable detector to vary phase and amplitude of the first and second output signals in accordance with the relative amplitude and phase of the first and second output signals.

2. The antenna polarization control circuit of claim 1 wherein the variable detector further comprises:

a first variable detector for receiving and adjusting the first output signal and generating a first baseline signal; and a second variable detector for receiving and adjusting the second output signal and generating a second baseline signal.

3. The antenna polarization control circuit of claim 2 further comprising a baseline coupler for receiving at least a portion of the first baseline signal and at least a portion of this second baseline signal, the baseline coupler generating a first coupled signal and a second coupled signal for input to the error correction circuit.

4. The antenna polarization control circuit of claim 2 further comprising an output coupler for receiving the first baseline signal and the second baseline signal, the output coupler generating first and second coupled baseline output signals.

5. The antenna polarization control circuit of claim 4, wherein the first and second output signals are output to a transducer, the transducer combining the first and second output signals to generate an antenna signal.

6. The antenna polarization control circuit of claim 1 wherein the coupler generates one of the first and second coupler outputs to a first polarization and an opposite polarization to another of the first and second coupler outputs in accordance with a selection of the polarization switch.

7. The antenna polarization control circuit of claim 6 wherein the opposite polarization is selected from one group of right hand circular polarization and left hand circular polarization.

8. The antenna polarization control circuit of claim 6 wherein the opposite polarization is selected from the group of horizontal polarization and vertical polarization.

9. An antenna system comprising:

a polarization switch, the polarization switch having an input for receiving an input signal and a first and second switch output, the polarization switch selecting one of the first and second switch outputs for receiving the input signal;

an input coupler, the input coupler having a first input and a second input for generating respective first and second input coupler signals, wherein the first and second input coupler signals have a predetermined phase difference, the first switch output of the polarization switch connected to the first input of the input coupler, the second switch output of the polarization switch connected to the second input of the input coupler;

a first amplitude and phase variable detector, the first amplitude and phase variable detector receiving as an input the first input coupler signal, the first amplitude and phase variable detector generating a first baseline signal;

a second amplitude and phase variable detector, the second amplitude and phase variable detector receiving as an input the second input coupler signal, the second amplitude and phase variable detector generating a second baseline signal;

an error correction circuit, the error correction circuit receiving the first and second baseline signals, the error correction circuit generating control signals to vary the first and second baseline signals of the first and second amplitude and phase variable detectors;

a transducer, the transducer receiving the first and second baseline signals and generating an antenna signal; and an antenna, the antenna having an input port receiving the antenna signal.

10. The antenna system of claim 9 wherein the antenna is a circularly polarized antenna.

11. The antenna system of claim 10 wherein the input coupler is a 3 dB coupler.

12. The antenna system of claim 9 wherein the input coupe a 3 dB coupler.

13. The antenna system of claim 9 wherein the antenna is a linearly polarized antenna.

14. An antenna polarization control circuit comprising:

a switch, the switch have an input and a first output and a second output, for selecting an antenna polarization;

an input coupler, the input coupler having a first input and a second input and a first output and a second output, the first and second outputs separated in phase by 90 degrees, the first output of the switch connected to the first input of the input coupler, the second output of the switch connected to the second input of the input coupler, for facilitating an antenna polarization;

a first amplitude and phase variable element, the first amplitude and phase variable element having an input, a variable input, and an output, the first output of the input coupler connected to the input of the first amplitude and phase variable element;

a second amplitude and phase variable element, the second amplitude and phase variable element having an input, a variable input, and an output, the second output of the input coupler connected to the input of the second amplitude and phase variable element;

a first amplifier, the first amplifier having an input and an output, the output of the first amplitude and phase variable element connected to the input of the first amplifier, a second amplifier, the second amplifier having an input and an output, the output of the second amplifier and the second amplitude phase variable element connected to the input of the second amplifier;

a second coupler, the second coupler having an input, an output, and a sampling output, the output of the first amplifier connected to the input of the second coupler, the second coupler generating a second coupled signal at said output of the second coupler;

a third coupler, the third coupler having an input, an output, and a sampling output, the output of the second amplifier connected to the input of the third coupler, the third coupler generating a third coupled signal at said output of the second coupler, an isolation switch, the isolation switch having a first input and a second input and a first output and a second output, the first and second outputs separated in phase by 90 degrees, the sampling output of the second coupler connected to the first input of the isolation switch, the sampling output of third coupler connected to the second input of the isolation switch, the isolation switch generating feedback error signals;

amplitude and phase error correction circuitry, the amplitude and phase error correction circuitry having a first input and a second input and a first output and a second output, the first input of the amplitude and phase error correction circuitry connected to the first output of the isolation switch, the second input of the amplitude and phase error correction circuitry connected to the second output of the isolation switch, the first output of the amplitude and phase error correction circuitry connected to the variable input of the first amplitude and phase variable element, the second output of the amplitude and phase error correction circuitry connected to the variable input of the second amplitude and phase variable element;

a fourth coupler, the fourth coupler having a first input and second input and a first output and second output, the first and second outputs separated in phase by 90 degrees, the first input of the fourth coupler receiving the second coupled signal, the second input of the fourth coupler receiving the third coupled signal, said fourth coupler recombining the outputs of the first and second amplifiers to produce a first transducer input signal and second transducer input signal;

an ortho-mode transducer receiving the first transducer input signal and the second transducer input signal, the ortho-mode transducer having a first input, a second input, and an output, the ortho-mode transducer generating an antenna signal from the first transducer input signal and the second transducer input signal; and an antenna, the antenna having an input port, the input port receiving the antenna signal.

15. The antenna polarization control circuit of claim 14 wherein the antenna is a circularly polarized antenna.

16. The antenna polarization control circuit of claim 14 wherein the input coupler is a 3 dB coupler.

17. The antenna polarization control circuit of claim 14 wherein the isolation switch is a 3 dB coupler.

18. The antenna polarization control circuit of claim 14 wherein the antenna is a linearly polarized antenna.

19. The antenna polarization control circuit of claim 14 wherein the fourth coupler is a 3 dB coupler.

* * * * *